(12) United States Patent
Kurchuk et al.

(10) Patent No.: US 6,272,327 B1
(45) Date of Patent: Aug. 7, 2001

(54) HIGH POWER WIRELESS TELEPHONE WITH OVER-VOLTAGE PROTECTION

(75) Inventors: Boris A. Kurchuk, East Windsor; Edwin A. Muth, Aberdeen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/099,251

(22) Filed: Jun. 18, 1998

(51) Int. Cl.[7] .............................. H04B 1/16; H04B 1/46
(52) U.S. Cl. .............................. 455/217; 455/83; 455/82
(58) Field of Search .............................. 455/83, 78, 217, 455/82, 84, 550, 90, 575; 370/278, 282, 287, 288

(56) References Cited

U.S. PATENT DOCUMENTS

| | | | |
|---|---|---|---|
| 3,139,584 | * 6/1964 | Fredrickson | 455/217 |
| 3,143,706 | * 8/1964 | Michael | 455/217 |
| 4,158,814 | * 6/1979 | Imazeki et al. | 455/78 |
| 5,241,701 | * 8/1993 | Andoh | 455/272 |
| 5,276,914 | * 1/1994 | Ishizuka et al. | 455/83 |
| 5,477,532 | * 12/1995 | Hoshigami et al. | 455/83 |
| 5,481,571 | * 1/1996 | Balachandran et al. | 375/347 |
| 5,524,274 | * 6/1996 | Takahashi et al. | 455/83 |
| 5,548,239 | * 8/1996 | Kohama | 455/82 |
| 5,745,844 | * 4/1998 | Kromer et al. | 455/250.1 |
| 5,777,530 | * 7/1998 | Nakatuka | 455/83 |
| 5,862,465 | * 1/1999 | Ou | 455/250.1 |
| 5,878,331 | * 3/1999 | Yamamoto et al. | 455/83 |
| 5,911,116 | * 6/1999 | Nosswitz | 455/83 |
| 5,930,695 | * 7/1999 | Yamaguchi et al. | 455/217 |
| 5,963,855 | * 10/1999 | Lussenhop et al. | 455/217 |
| 5,974,040 | * 10/1999 | Kimura | 455/250.1 |
| 5,978,665 | * 11/1999 | Kim | 455/250.1 |
| 5,999,523 | * 12/1999 | Murtojärvi | 455/83 |
| 5,999,578 | * 12/1999 | Ha | 455/250.1 |
| 6,009,316 | * 12/1999 | Tsuji | 455/83 |

FOREIGN PATENT DOCUMENTS 0 814 570 * 12/1997 (EP) .............................. H04B/1/10

* cited by examiner

*Primary Examiner*—William Trost
*Assistant Examiner*—Rafael Perez-Gutierrez
(74) *Attorney, Agent, or Firm*—Priest & Goldstein, PLLC

(57) ABSTRACT

A transceiver is disclosed for use in a wireless handset. The transceiver includes a switch for connecting an antenna, one at a time, to a receiver or to a transmitter. In a reception sub-frame, a limiting circuit switches the switch to an attenuated mode when an output signal of the receiver, such as a logarithmic RSSI signal, exceeds a predetermined value. The limiting circuit includes a comparator for comparing the logarithmic RSSI signal with the predetermined value. In addition, the limiting circuit also includes a transistor which shunts to ground a first control input of the switch when the RSSI signal exceeds the predetermined value. The limiting circuit further includes a shunt circuit to maintain the attenuated mode during a transmission sub-frame to reduce the level of a signal from the transmitter. The shunt circuit includes a trigger circuit for latching the output of the comparator to turn on another transistor which shunts to ground a second control input of the switch when the RSSI signal exceeds the predetermined value in the reception sub-frame, which is immediately prior to a current transmission sub-frame.

24 Claims, 5 Drawing Sheets

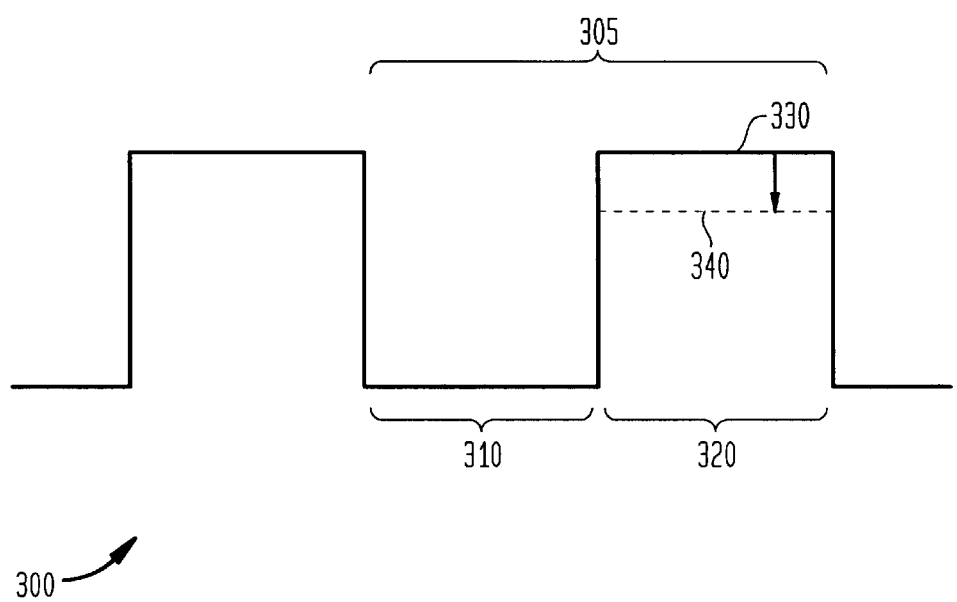

HIGH POWER WIRELESS TELEPHONE WITH OVER-VOLTAGE PROTECTION

BACKGROUND OF THE INVENTION

1. Field of the Invention

The present invention is directed to a high power wireless telephone, and more particularly, to a high power digital cordless telephone with over-voltage protection that prevents receiver saturation.

2. Discussion of the Prior Art

Wireless telephones and base stations each has a radio frequency (RF) transmitter section and a receiver section, the combination of which is often referred to as a transceiver. The RF transmitter and receiver have been integrated on monolithic integrated chips (ICs) which are widely used in wireless communications. The receive section of a mobile telephone system is typically formed on a single IC and contains an input low noise amplifier (LNA), a mixer, and an oscillator. Such ICs containing transmitter or receiver sections provide low cost, low power consumption, and small size solutions for analog and digital cordless/wireless telephones. In addition, these ICs work very well at low input power signal levels.

One of the main methods to increase phone range is to increase its output power. However, power levels larger than a certain level overload the front end (input) RF circuits of the receiver. This occurs when the handset radio is too close to the base radio, for example, when the cordless handset is in the charging cradle. Overloading of the receiver (RF IC) causes various problems, such as increasing noise, degrading or even preventing a link between the handset and the base from being established, and increasing the bit error rate (BER) of the received signal.

The transmitter sections of both the handset and the base station have power control to increase transmission power when the distance therebetween increases, and to decrease transmission power when the wireless telephone is close to its base. One reason for power control is to prevent saturation or overload of the LNA located in the receiver of the handset or the base.

Power control is particularly important for high power cordless telephones having at least two handsets and one base, where each handset is at a different distance from the base. For example, one handset is on the base cradle for battery charging while the other handset is far away, such as a mile away for high power cordless phones. In this case, the base must transmit with high power to establish a link with the far handset. Without power control, the near handset receiver would be overloaded, thus increasing BER and even preventing establishment of a link between the near handset and the base.

In the case of an overloaded receiver, there are several options to establish a link. One option is increase the minimum distance between handset radio and base radio. Another option is to decrease the output power of the transmitter, and hence reduce the maximum range of the telephone. However, the reduced power may not be sufficient to establish a link with the far handset. A further option is to reduce the received RF input power level of the receiver by implementing special RF limiting circuits.

Different types of RF limiting circuits have been used in the input RF circuit of the receiver section, typically between the LNA and the antenna, to protect the input RF circuits by reducing the amplitude of received RF signal. Such RF limiting circuits include Shottky diode limiters, PIN diode limiters and ferrite limiters. However, these conventional RF limiting circuits add to the loss of the input RF circuits, thus reducing the levels of the received signals even when no reduction is desired.

The additional signal level loss resulting from conventional RF limiters decreases signal-to-noise ratio (SNR) of the receiver, thus degrading sensitivity and range of the telephone. Further, the conventional RF limiting circuits are large and consume valuable real estate on the board, thus preventing miniaturization of handsets and base stations. In addition, the conventional RF limiting circuits are costly and require relatively large power, thus increasing the telephone price and decreasing operation time before battery recharge is required. Accordingly, there is a need for an efficient power control which does not increase size and cost of wireless/cordless telephones and allows establishment of simultaneous links between a base and near and far handsets, with minimal degradation of SNR and BER.

SUMMARY OF THE INVENTION

The object of the present invention is to provide a transceiver for high power wireless telephones which eliminates the problems of conventional high power wireless telephones.

Another object of the present invention is to provide a transceiver which is inexpensive and provides no additional loss. A further object of the present invention is to provide a transceiver which consumes minimal area and allows miniaturization of wireless systems.

A still further object of the present invention is to provide a transceiver which provides fast power control to prevent receiver overloading without degrading receiver sensitivity or signal to noise ratio (SNR), bit error rate (BER), and telephone range.

The present invention accomplishes the above and other objects by providing a transceiver for a wireless handset, for example. The transceiver includes a switch for connecting an antenna one at a time to a receiver or to a transmitter. In a reception sub-frame, a limiting circuit switches the switch to an attenuated mode when an output signal of the receiver, such as a proportional or a logarithmic RSSI signal, exceeds a predetermined value or threshold voltage $V_{th}$.

The limiting circuit includes a comparator for comparing the RSSI signal with the predetermined value. In addition, the limiting circuit also includes a transistor which shunts to ground a first control input of the switch when the RSSI signal exceeds the predetermined value. The limiting circuit further includes a shunt circuit to maintain the attenuated mode during a transmission sub-frame to reduce the level of a signal provided from the transmitter.

The limiting circuit includes a trigger circuit for latching the output of the comparator to turn on another transistor which shunts to ground a second control input of the switch when the RSSI signal exceeds the predetermined value in the reception sub-frame, which is immediately prior to a current transmission sub-frame, for example.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 7 is a timing diagram showing a transceiver operation frame having a reception sub-frame and a transmission sub-frame according to the present invention.

DETAILED DESCRIPTION OF THE INVENTION

Figure 1:
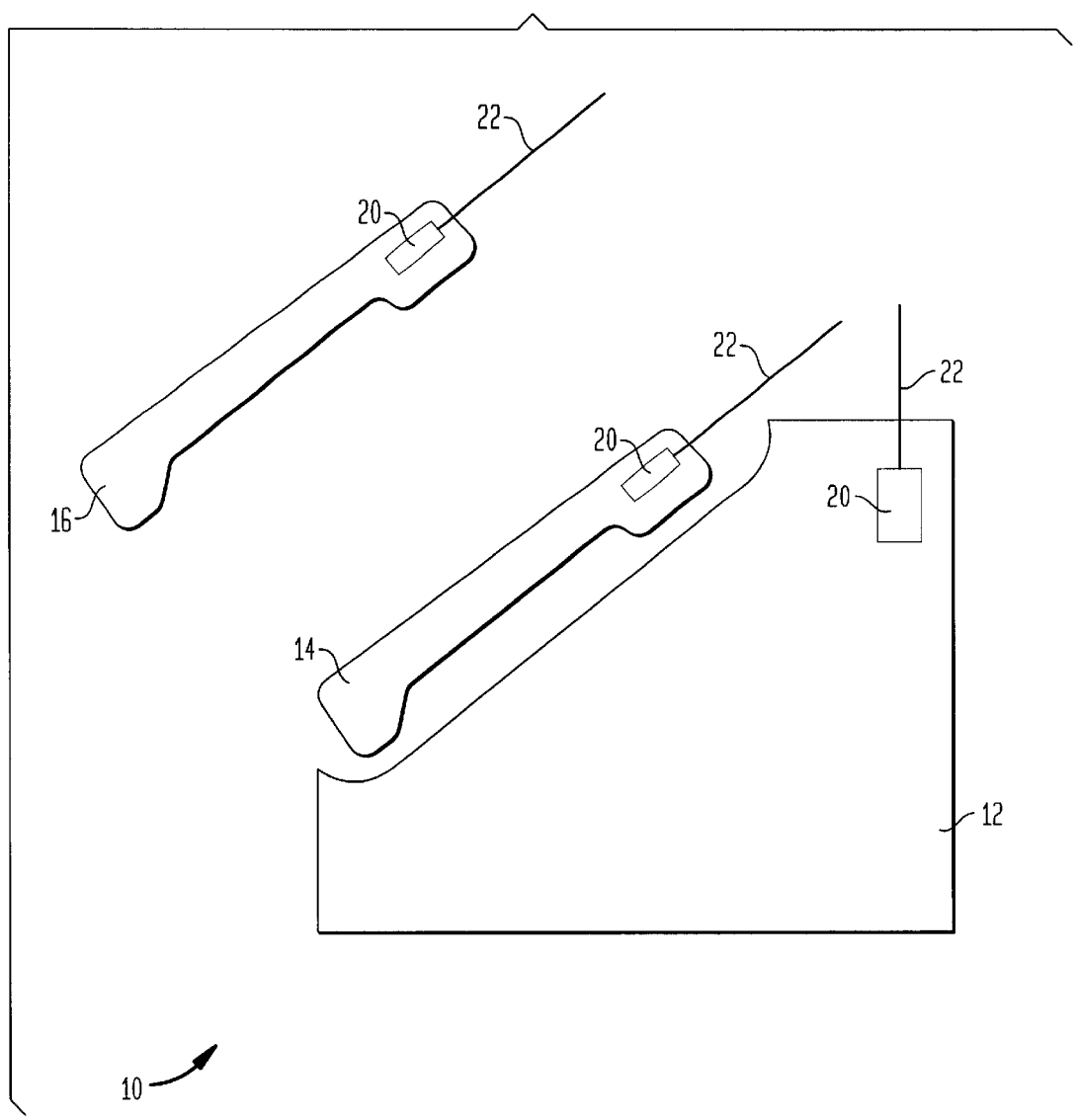
FIG. 1 shows a high power wireless telephone according to present invention.

FIG. 1 shows a wireless telephone, such as a high power cordless telephone system 10 having a base station 12 and one or more handsets. Illustratively, two handsets 14, 16 are shown in FIG. 1, where one handset 14 is near or on the base station for charging, while the other handset 16 is far away, e.g., approximately 1 mile away. Although the present invention is described using a cordless telephone as an illustrative example, it is understood by those skilled in the art that the present invention is equally applicable to any wireless mobile radio communication, such as cellular telephones or the like.

Figure 2:
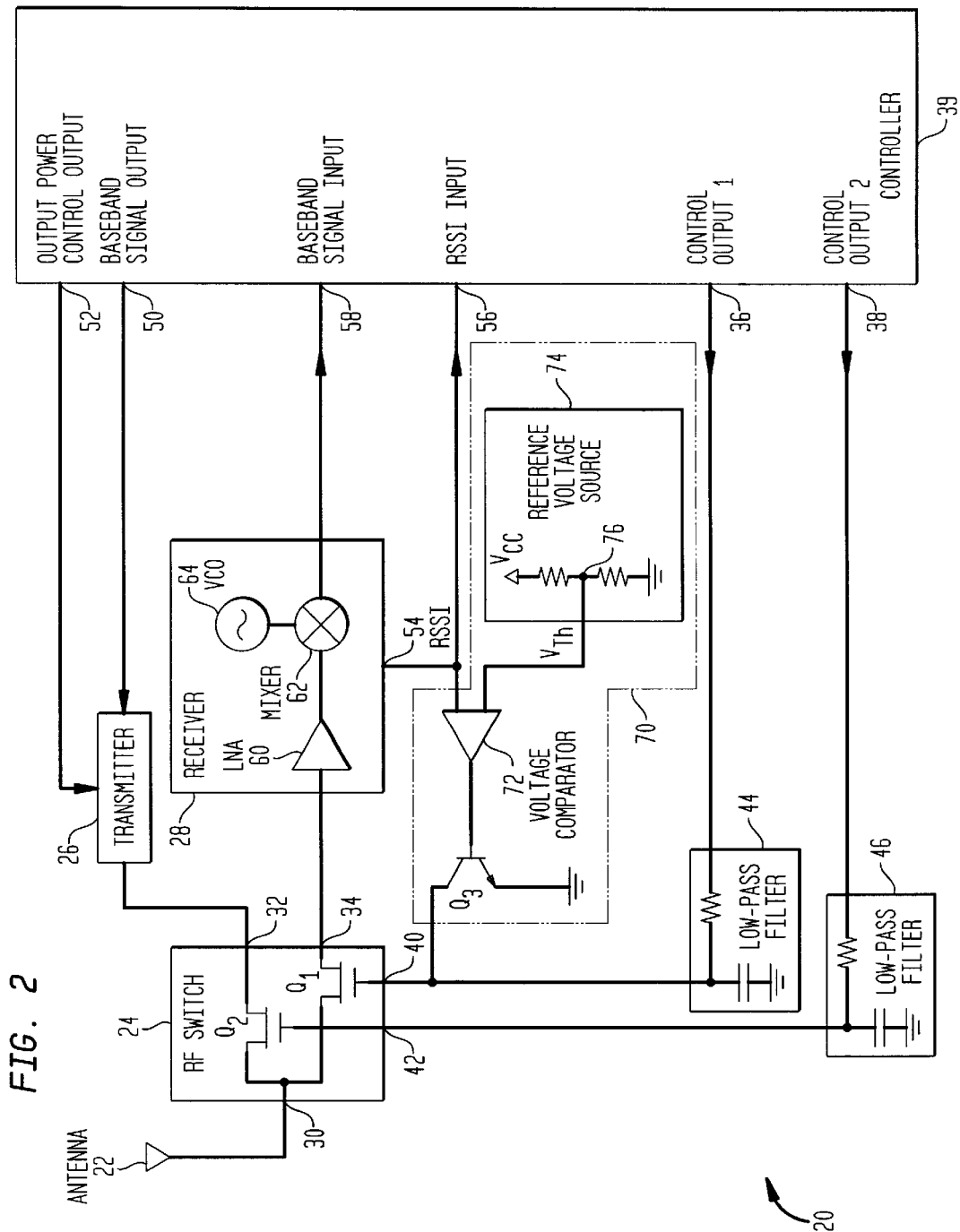
FIG. 2 shows a transceiver according to present invention.

Each of the units of the telephone system 10, namely the base 12 and two handsets 14, 16, has a transceiver 20 with an antenna 22 for transmitting and receiving signals therebetween. FIG. 2 shows the transceiver 20 in greater detail. The transceiver 20 is a time division duplexer transceiver, for example, having a single antenna 22 for both transmitting and receiving. The transceiver transmits during one time segment of its operation cycle 305 (FIG. 7) where the receiver is off, referred to as a transmission sub-frame, shown as numeral 320 in FIG. 7. Similarly, the transceiver 20 receives during another time segment or reception sub-frame 310 (FIG. 7) where the transmitter is off. In addition to sharing the antenna, alternatively turning on the receiver and the transmitter one at a time for only a portion of the cycle time 305 (FIG. 7) conserves power and extend battery recharge time.

As shown in FIG. 2, the transceiver 20 comprises a switch 24, such as a radio frequency (RF) switch, that selectively connects one at a time either an RF transmitter 26 or an RF receiver 28 to the antenna 22. The antenna 22 is connected to an antenna port 30 of the switch 24, while the transmitter 26 and receiver 28 are connected to the switch transmit and receiver ports 32, 34, respectively.

The switch 24 is controlled by control signals from control outputs 36, 38 of a controller 39. The controller 39 includes various elements for processing signals and controlling the telephone system, such as a time division duplexer (TDD), digital signal processors, micro-controllers or microprocessors, memory, analog-to-digital and digital-to-analog converters, audio circuits and the like, which are typically found and commonly used in wireless telephone systems as well known in the art. The control signals from the control outputs 36, 38 are provided to control inputs 40, 42 of the switch 24, through filters, such as low-pass RC filters 44, 46 which filter out transient spikes and high frequency components coupled to the control lines from the transmitter 26, for example.

Illustratively, the RF switch 24 includes power transistors, such as two field effect transistors (FETs) Q1, Q2, which receive the control signals at their gate. A high level on the control signals provided to the FET gates turns on the respective FETs to short together their respective source and drain. Turning on one of the FETs at any one time connects the antenna 22 to either the transmitter 26 or the receiver 28.

Specifically, in the receive mode of the handset or the base, the antenna 22 is connected to the receiver 28 and disconnected from the transmitter 26. This is achieved by having a high level on the first control input 40 (or gate of FET Q1), thus turning on the first FET Q1; and a low level on the second control input 42 (or gate of FET Q2), thus turning off the second FET Q2. The OFF second FET Q2 provides at least 20 dB attenuation, for example, thus in effect disconnecting the antenna 22 from the transmitter 26.

In the transmit mode of the handset or the base, the antenna 22 is connected to the transmitter 26 and disconnected from the receiver 28. This is achieved by having a low level on the first control input 40 (or gate of FET Q1), thus turning off the first FET Q1; and a high level on the second control input 42 (or gate of FET Q2), thus turning on the second FET Q2. The OFF first FET Q1 provides greater than 20 dB attenuation, for example, thus in effect disconnecting the antenna 22 from the receiver 28 and isolating it from the transmitter 26.

In the transmit mode, the transmitter 26 receives a baseband signal which contains the information to be transmitted from a baseband signal output port 50 of the controller 39. The transmitter 26 modulates the baseband signal for transmission thereof using one of many modulation schemes which are well known in the art. The transmitter 26 also receives a power control signal from a power control output port 52 of the controller 39. The power control signal adjusts the gain of a power amplifier of the transmitter 26 in order to transmit with the proper power level.

The power control level is provided in response to the power of the received signal from the receiver 28 and the bit error rate (BER) of the received signal. For example, when the received signal's power is high, indicating that the receiver is near the base or the base is transmitting at a high level, then the power control signal reduces the gain of the transmitter 26. Similarly, when the BER of the received signal is high, then the power control signal increases the gain of the transmitter 26 in order to reduce the BER to an acceptable level.

The transceiver 20 is located in both the handset and the base. Thus, it is understood by those skilled in the art that the power control adjustment occurs in the transmitter of the handset and/or the base. Illustratively, a received signal strength indicator (RSSI) signal from the receiver 28 is used to derive the power control signal which adjusts the gain of the transmitter 26. Instead of a proportional RSSI signal, a logarithmic RSSI signal is used for example. The logarithmic RSSI signal has a wide dynamic range and thus can be used to control the output power of the transmitted signal as well as the attenuation of the received signal. The logarithmic RSSI signal is a direct current (DC) signal which indicates the level of the RF signal received by the receiver 28, and is provided from an RSSI output port 54 of the receiver 28 to an RSSI input port 56 of the controller 39.

In the receive mode where Q1 is ON and Q2 is OFF, the receiver 28 detects a modulated signal from the antenna 22.

Using demodulation schemes well known in the art, the receiver 28 demodulates the received signal and provides a baseband signal to a baseband input port 58 of the controller 39 for further processing, such as providing an audio signal to a speaker for hearing by a user of the telephone.

The receiver 28 includes a low noise amplifier (LNA) 60 which receives and amplifies the modulated RF signal received from the antenna 22. The amplified RF signal is provided to a mixer 62 which uses a carrier signal provided from an oscillator 64, such a voltage controlled oscillator (VCO), to demodulate the amplified RF signal and output the baseband signal to the baseband input port of the controller 39.

As described above, the receiver 28 also outputs the logarithmic RSSI signal to the RSSI input port 56 of the controller 39 for use in power control of the transmitter 26 in the transmit mode. In addition to the transmitter power control, the logarithmic RSSI signal is also used to control power levels, i.e., attenuation, of the input RF signal received by the receiver 28 in the receive mode in order to prevent overloading thereof. The power of the received signal is controlled without additional circuits in the receive path by using the RF switch 24 as an attenuator.

For received signal power control, the logarithmic RSSI signal is provided to a limiting circuit 70 which switches the switch 24 to reduce a level of modulated RF signal received by the LNA 60 from the antenna 22, when the level of the modulated RF signal as indicated by the RSSI signal exceeds a predetermined value.

In particular, the limiting circuit 70 includes a comparator 72 which compares the RSSI signal with the predetermined value also referred to as a reference or threshold voltage $V_{th}$ signal provided from a reference voltage source 74. Illustratively, the reference voltage source 74 is a voltage divider comprising two resistors connected in series between a DC voltage source Vcc and ground, where the reference voltage signal is provided from a node 76 located between the two resistors.

Alternatively, the reference voltage is provided from a source under the control of the controller 39, which has stored in its memory an optimum value for the reference voltage $V_{th}$ calibrated for the particular ICs in the receiver circuit. In addition, the controller 39 varies its reference voltage $V_{th}$ source to compensate for other changes, such as temperature changes, and to dynamically control the comparator output and thus attenuation of the received signal. For example, the threshold voltage $V_{th}$ is varied by the controller 39 to track logarithmic RSSI signal changes which are not related to the received RF signal level, such as due to environmental changes.

Due to parameter variations, different receivers and ICs have different ideal threshold voltages $V_{th}$. To eliminate errors due to parameter variations, the ideal threshold voltages $V_{th}$ for each particular receiver is determined during calibration and stored in the controller memory. Thus, different ideal threshold voltage values are used for different receivers.

Each individual transceiver may be calibrated to determine the ideal threshold voltage $V_{th}$ therefor. This is achieved by providing a known signal level at the antenna port 30 of the switch 24 in the receive mode, where this known signal level is below the level that saturates or overloads the receiver 28, such as 5 dB below the saturation level. With this input level provided to the receiver 28, the receiver RSSI output is measured. This measured RSSI output is the ideal threshold voltages $V_{th}$ for the particular receiver, and varies for different receivers. Thus, different receivers provided with the same saturation input level will result in different RSSI output levels. The saturation RSSI output level for each particular receiver is stored in the controller memory as the ideal threshold voltage $V_{th}$ for the particular receiver.

Further, the controller 39 varies the reference voltage $V_{th}$ as a function of temperature using a table of reference voltages versus temperature stored in the controller memory. The RSSI output is generally inversely related to the temperature. Thus, as temperature increases, the ideal threshold voltage value decreases. Typically, systems having rechargeable batteries such as wireless telephones have a thermistor to measure temperature for limiting the battery charge current if temperature increases. The temperature changes measured using the thermistor may be used to adjust the threshold voltage $V_{th}$ in accordance with the stored table of predetermined threshold voltage values and associated temperatures which are stored in the memory of the controller 39. Controlling the reference voltage from the controller 39 provides flexibility and eliminates errors due to parameter and environmental changes.

Accordingly, individual transceivers may be calibrated to determine and store the ideal threshold voltage where saturation occurs for the particular receiver, as well as the ideal threshold voltages as a function of temperature. The stored threshold voltage values are used instead of using the voltage divider. Additional controller outputs are not required. This compensates for any RSSI signal level deviations as a function of IC parameters and temperature changes. IC parameter deviations are due to different RSSI output levels in response to the same input or received RF signal level.

The limiting circuit further includes a transistor, such as a bipolar pnp transistor Q3, which shunts to ground the first control input of the first transistor Q1 of the switch 24 when the RF modulated received signal level exceeds a certain value. This prevents saturation or overloading of the LNA 60. In particular, the comparator 72 compares its two inputs and when the RSSI signal exceeds the threshold voltage $V_{th}$, then the comparator 72 outputs a high signal.

The output of the comparator 72 is connected to the base of the pnp transistor Q3. As the power of the received signal increases, the DC voltage of the logarithmic RSSI signal also increases. When the RSSI voltage is greater than the threshold voltage $V_{th}$, then the output of the comparator goes from low to high. The high level of the comparator output signal turns on the pnp transistor Q3, thus switching transistor Q3 from open to close, where its emitter and collector become connected or shorted together.

Transistor Q3 has its emitter connected to ground and its collector connected to the first control port 40 or gate of the first FET transistor Q1 of the switch 24. The ON pnp transistor Q3 with its emitter and collector shorted together, connects the gate of the first FET transistor Q1 to ground. This turns off (or opens) the first FET transistor Q1. In this mode, referred to as the attenuated receive mode, both FET transistors Q1, Q2 of the RF switch are off (or open).

In the attenuated receive mode, the RF switch attenuates the RF signal received from the antenna and provides an attenuated RF signal to the LNA 60. Illustratively, the RF switch provides 10 dB of attenuation in the attenuated receive mode. The attenuated RF signal prevents saturation or overloading of the LNA 60, maintains the SNR and BER at acceptable levels, and allows proper signal processing and establishing of a link between the handset and the base.

Table 1 shows the signal levels at the control inputs 40, 42 of the RF switch 24 in the three modes, namely, the transmit, receive and attenuated receive modes.

TABLE 1

| First Control Input (40) | Second Control Input (42) | Mode |
|---|---|---|
| 0 | 1 | transmit |
| 1 | 0 | receive |
| 0 | 0 | attenuated receive |

In addition to switching, the RF switch is also used as an attenuator in the attenuated receive mode. In the receive mode, the RF switch does not create any additional RF signal loss in the receive path since there are no additional circuit elements.

The following are illustrative attenuation values provided by the RF switch 24 in the three modes. In the transmit mode, the RF switch 24 provides less than 0.5 dB attenuation in the transmit path between its antenna port 30 and the transmit port 32, and a high insertion loss in the receive path, such as greater than 20 dB of attenuation between the antenna port 30 and the receive port 34. In the receive mode, the RF switch 24 provides greater than 20 dB attenuation in the transmit path, and a very low insertion loss in the receive path, such as less than 0.5 dB of attenuation. Further, in the receive mode, the RF switch 26 provides high isolation between its transmit and receive ports 32, 34, such as greater than 20 dB or 30 dB. In the attenuated receive mode, as well as in an attenuated transmit mode as will be described in connection with FIG. 6, the RF switch 24 provides approximately 10 dB attenuation in the receive path between the antenna port 30 and the receive port 34.

In this attenuated mode where both FETs Q1, Q2 are OFF, the RF switch 24 also provides approximately 10 dB attenuation in the transmit path between the antenna port 30 and the transmit port 32. This 10 dB of isolation is sufficient since the transmitter 26 is not transmitting in the receive or the attenuated receive modes, which occur during the reception sub-frame 310 shown in FIG. 7. Note, in the transmit mode or transmission sub-frame 320 (FIG. 7) where the transmitter 26 is transmitting, the 10 dB of isolation between the transmitter 26 and the receiver 28 is also sufficient, since any signals at the receiver 28 are discarded and not processed. The receiver 28 processes signal received only during the reception sub-frame 310 (FIG. 7).

Figure 3:
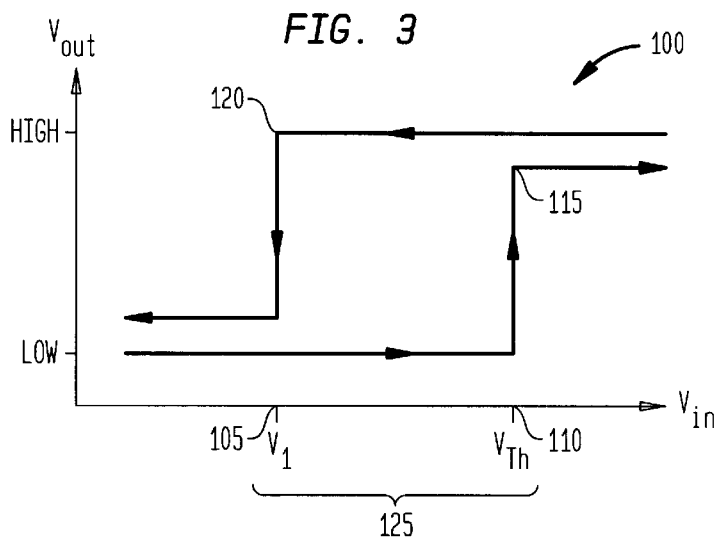
FIG. 3 shows a hysteresis diagram of the transceiver shown in FIG. 1 according to present invention.

The voltage comparator 72 has a hysteresis that allows proper operation of the transceiver 20 and prevents premature or oscillatory type of switching between the receive and attenuated modes. FIG. 3 shows a $V_{in}$ versus $V_{out}$ hysteresis plot 100 of the comparator 72, where $V_{in}$ is the RSSI signal. Moving from point 105 to point 110 in FIG. 3, the RSSI voltage or $V_{in}$ increases from $V_1$ to $V_{th}$. When $V_{in}$ reaches or exceeds the threshold voltage $V_{th}$, the output of the comparator $V_{out}$ increases from $V_{low}$ to $V_{high}$ as shown by the arrow from point 110 to point 115. This shunts the first control input 40 of the switch 24 to ground, thus reducing the input RF signal, by 10 dB for example, as well as reducing the RSSI signal.

Oscillation occurs without hysteresis, where the reduced RSSI signal or $V_{in}$ causes the comparator output $V_{out}$ to go back from high to low, which in turn switches the mode from attenuated receive to receive, thus increasing the RSSI signal. The increased RSSI signal switches the mode from receive to attenuated receive. This process of switching between the receive and attenuated receive modes repeats causing instability and oscillation if the comparator is without hysteresis.

The comparator hysteresis prevents this oscillatory mode switching as follows. As shown in FIG. 3, when the RSSI signal or $V_{in}$ exceeds the threshold voltage $V_{th}$, and the comparator output $V_{out}$ goes high, this output $V_{out}$ stays high until the input voltage decreases to $V_1$, as shown by the arrow from point 115, to point 120. At point 120, where the input or RSSI voltage equals or is less than $V_1$, then the output voltage drops from $V_{high}$ to $V_{low}$, as shown by the arrow from point 120 to point 105. The hysteresis swing 125, which is the voltage difference between $V_1$ and $V_{th}$, is greater than the RSSI output voltage drop when the RF input signal is reduced, e.g., 10 dB, by the RF switch 24 when switched from the receive mode to the attenuated receive mode.

Figure 4:
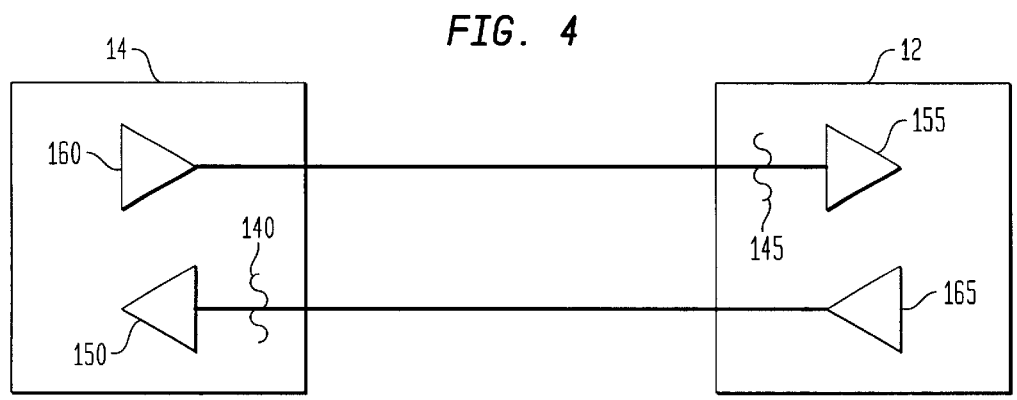
FIG. 4 shows a wireless telephone system having a limiting circuit for controlling a switch to provide attenuation for only the receivers of both the telephone handset and the base station according to the present invention.

Referring to FIGS. 2 and 4, receiver attenuators 140, 145 using the limiting circuit 70 is provided in the receive section 150 of the handset 14 and in the receive section 155 of the base station 12, respectively. Alternatively, only either the handset 14 or the base 12 has the limiting circuit 70 for receiver attenuation. In these embodiments, the transmitter sections 160, 165 of the handset 14 and base 12 do not have the limiting circuit 70.

Figure 5:
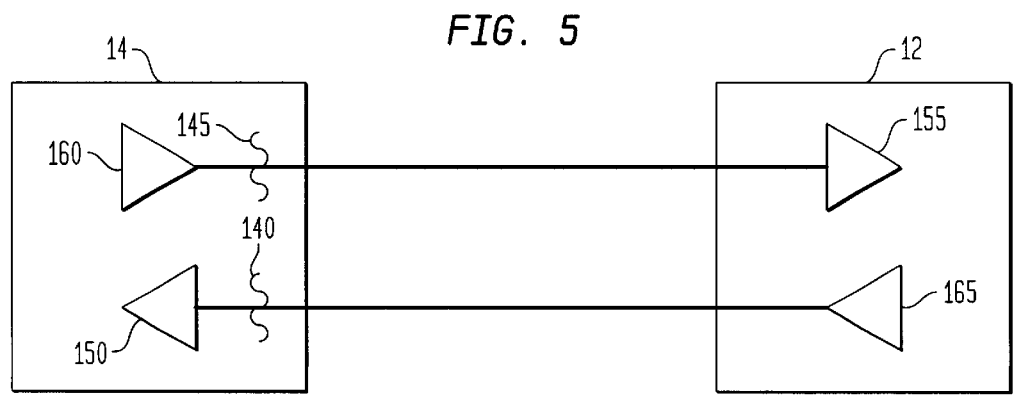
FIG. 5 shows a wireless telephone system having a limiting circuit for controlling a switch to provide attenuation for both the receiver and transmitter of the telephone handset according to the present invention.
Figure 6:
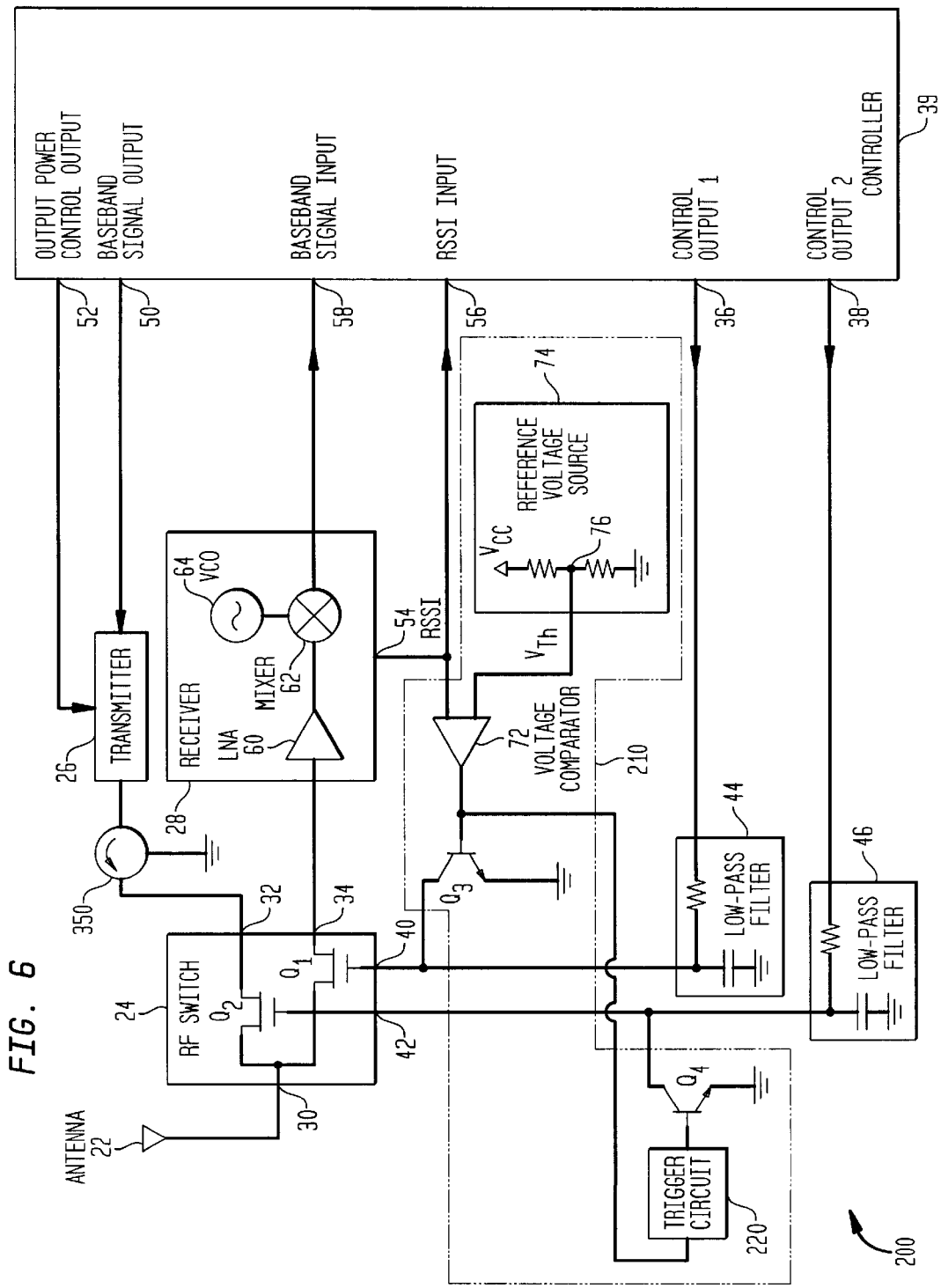
FIG. 6 shows a transceiver according to another embodiment of the present invention.

In yet another embodiment, the limiting circuit 70 is configured to provide attenuation to both the receiver 28 and transmitter 26 of either the handset 14 or the base 12. FIG. 5 shows the case where the limiting circuit provides attenuators 140, 145 for the receiver 150 and transmitter 160 of the handset 14. FIG. 6 shows a transceiver 200 having a limiter circuit 210 which provides attenuation to both the receiver 26 and transmitter 28 for the embodiment shown in FIG. 5.

In comparison to transceiver 20 shown in FIG. 1, the transceiver 200 of FIG. 6 further includes a triggering circuit 220 that latches the output of the comparator 72, e.g., when it is high during the receive sub-frame 310 (FIG. 7). The latched high output is maintained at the high value during the transmit sub-frame 320 (FIG. 7). In particular, the trigger circuit 220 latches the output of the comparator 72 to turn on a pnp transistor Q4, for example, which shunts to ground the second control input 42 of the switch 24 when the RSSI signal exceeds the threshold voltage $V_{th}$ during the reception sub-frame 310 (FIG. 7), which is immediately prior to a current transmission sub-frame 320 (FIG. 7), for example.

As shown in FIG. 6, the output of the triggering circuit 220 is connected to the base of the pnp transistor Q4 having its collector connected to the second control input 42 of the RF switch 24 and its emitter connected to ground.

Similar to the transistor Q3, when the output of the comparator 72 is high, in response to a high RSSI signal of the receiver 28, then the transistor Q4 shunts the switch second control input 42 or gate of FET Q2 to ground, thus opening the FET Q2 and switching the mode from the transmission mode to the attenuated transmission mode. Note in both the attenuated transmission mode and the attenuated reception mode, both control inputs 40, 42 of the RF switch 24 are low. The difference between the two attenuated modes is that the attenuated transmission mode occurs during the transmission sub-frame 320 (FIG. 7) of the operating cycle or frame 305 (FIG. 7), while the attenuated reception mode occurs during the reception sub-frame 310 (FIG. 7).

FIG. 7 is a timing diagram 300 showing an operation cycle or frame 305, where the reception segment or sub-frame is referenced by numeral 310 and the transmission segment or sub-frame is referenced by numeral 320.

Referring to FIGS. 6–7, during the reception segment 310, when the level of the received RF signal, (as indicated by the RSSI signal from the receiver) is higher than the threshold voltage $V_{th}$, the comparator output goes high to shunt the first control input 40 of the RF switch 24 to ground (i.e., the attenuated receive mode) through the pnp transistor Q3.

The high comparator output also activates the trigger circuit 220 which latches and outputs the high level to the base of the pnp transistor Q4. The latched high level at the base of the pnp transistor Q4 keeps the second control port 42 at ground despite the absence of a comparator high output. The comparator output is no longer high in the transmit mode, since there is no RSSI signal in the transmit mode, let alone an RSSI signal that exceeds the threshold voltage $V_{th}$.

The grounded second control port 42 resulting from the latched trigger circuit output keeps off the transmission path FET Q2 during the transmission segment or sub-frame 320. Note the transmission path FET Q2 was turned off during a reception sub-frame 310, which is prior to the current transmission sub-frame 320, when the RSSI signal during this previous reception sub-frame 310 was larger than the threshold voltage $V_{th}$. In fact, the response time for transmission power control is very fast, and transmission power control occurs during the transmission sub-frame 320 which is immediately after a reception sub-frame 310 where a high RSSI is detected.

The OFF transmission path FET Q2 during the transmission sub-frame 320, i.e., in attenuated transmission mode, attenuates the output from the transmitter 26 signal. Thus, the level of the transmitted signal is reduced from the solid line 330 to the dashed line 340 shown in FIG. 7. This reduces the level of the signal provided to the antenna for transmission by 10 dB, for example.

If necessary, a circulator 350 may be provided between the transmission path FET Q2 and the transmitter 26. The circulator 350 isolates and protects the transmitter from any reflected power resulting from the mismatch between the transmitter output impedance and the load impedance, due to the high impedance of the OFF transmission FET Q2.

Attenuating the transmitted signal using the RF switch 24 along with the trigger circuit 220 provides transmission power control with is much faster than the conventional transmission power control where the power amplifier's gain of the transmitter 26 is adjusted in response to the output power control signal from the output 52 of the controller 39.

In particular, power control using the RF switch 24 as an attenuator is achieved during successive reception and transmission segments 310, 320. Typically, the duration of each the reception and transmission segments 310, 320 is approximately 2.5 msec. When a large RSSI is detected during the reception segment 310, the RF switch 24 is switched to the attenuated mode within the same reception segment 310, and latched or maintained in the attenuated mode in the very next or successive transmission segment 320.

In contrast, when a large RSSI signal is detected in the receive segment 310, transmission power control is not possible in the very next transmission segment 320, which is immediately after the reception segment 310. Rather, it takes nearly 2 seconds for a conventional transmission power control, where the power control signal from the controller port 52 is provided for lowering the gain of the transmitter's power amplifier. During those 2 seconds, catastrophic failures might occur where the call is lost since the high RF power overloads the receiver 28, which in turn lowers the quality of speech.

Conventional transmission power control typically depends on both the RSSI signal and the quality of speech. Thus, despite the high RSSI level, the lower quality of speech prevents the controller 39 from lowering the transmitter gain and reducing the power of the transmitted signal; the gain may even be increased in an attempt to improve the speech quality. The high RF signal power saturates the receiver, increases the received BER, decreases the receiver SNR, and degrade or even cuts off the link between the base and handset.

The transceiver having the limiting circuit provides overvoltage protection to the receiver by attenuating the received RF signal when it exceeds a certain level when detected by comparing the receiver RSSI signal with a reference voltage. This is in addition to, or in lieu of, power control of the transmitter, where the RSSI signal is used to adjust the transmitter gain or power output. The limiting circuit is simple and inexpensive, as it includes the comparator 72 which receives a reference voltage $V_{th}$. A driver, such as the pnp transistor Q3, is also provided to control one of the control inputs of the RF switch 24.

Illustratively, the transceiver is incorporated in high power cordless telephone system that use frequency hopping, where the frequency (or channel number) of the receive and transmit signals are changed, e.g., every 5 msec. The amplitude of the receive signal, and hence the RSSI signal level, depend on the frequency of receive signal. Generally speaking this is a random value because fading of the receive signal is not a constant value and depends on frequency.

The transceiver tracks the amplitude of each packet and protects the receiver from overloading at each frequency. As described, at some frequencies where the RSSI signal is greater than the RSSI threshold level $V_{th}$, then the transceiver attenuates the input signal. At the same time at the other frequencies, the transceiver will not attenuate the input signal if the RSSI signal is below the RSSI threshold level $V_{th}$.

Because no additional devices are added in the receive path, the limiting circuit does not degrade the SNR and sensitivity of the receiver, the BER of the received signal, or the range of the telephone. Further, the limiting circuit consumes minimal real estate if any. Typically no additional real estate or components are needed, since the elements of the limiting circuit, namely, the comparator 72, threshold voltage source 74 and transistor Q3 are likely to be available as unused portions of chips forming the handsets or base stations.

Thus, the limiting circuit allows for miniaturization of the transceiver and prevents increased cost and power consumption. The transceiver is used with any type of transmission line, including microstrip transmission line type devices, and hence can be used in wireless telephones. The transceiver is particularly suited for high power cordless phones and cellular phones. The transceiver allows a high power cordless phone to have more than one handset without any substantial system limitations on the telephone range and the transmitted power level.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A wireless handset comprising:

an antenna;

a receiver for receiving a switched signal;

a transmitter transmitting a transmitted signal;

a switch having an antenna terminal connected to said antenna, a receive terminal connected to said receiver, and a transmitter terminal connected to said transmitter; and a limiting circuit which switches said switch to an attenuated mode to reduce a level of said switched signal when an output signal of said receiver exceeds a predetermined value;

wherein said limiting circuit includes a shunt circuit to maintain said attenuated mode during transmission of said transmitted signal to reduce a level thereof;

wherein said shunt circuit includes a trigger circuit for latching an output of said limiting circuit to turn on a transistor which shunts to ground a control input of said switch when said output signal exceeds said predetermined value in a reception sub-frame.

2. The wireless handset of claim 1, wherein said reception sub-frame is immediately prior to a current transmission sub-frame.

3. A wireless handset comprising:

an antenna;

a receiver for receiving a switched signal;

a transmitter transmitting a transmitted signal;

a switch having an antenna terminal connected to said antenna, a receive terminal connected to said receiver, and a transmitter terminal connected to said transmitter, said switch comprising a first transistor connected between said antenna terminal and said transmitter terminal, and a second transistor connected between said antenna terminal and said receiver terminal; and a limiting circuit which switches said switch to an attenuated mode by turning both said first transistor and said second transistor off to reduce a level of said switched signal when an output signal of said receiver exceeds a predetermined value;

wherein said limiting circuit includes a trigger circuit for latching an output of said limiting circuit to turn on a transistor which shunts to ground a control input of said switch when said output signal exceeds said predetermined value in a reception sub-frame.

4. The wireless handset of claim 3, wherein said limiting circuit includes a shunt circuit to maintain said attenuated mode during transmission of said transmitted signal to reduce a level thereof.

5. A transceiver comprising:

a switch having a first terminal for receiving a received signal, a second terminal, and a third terminal, said switch comprising a first transistor connected between said first terminal and said second terminal, and a second transistor connected between said first terminal and said third terminal;

a receiver connected to said second terminal of said switch for receiving a switched signal; and a limiting circuit which switches said switch to an attenuated mode by turning both said first transistor and said second transistor off to reduce a level of said switched signal when an output signal of said receiver exceeds a predetermined value;

wherein said limiting circuit includes a trigger circuit for latching an output of said limiting circuit to turn on a transistor which shunts to ground a control input of said switch when said output signal exceeds said predetermined value in a reception sub-frame.

6. The transceiver of claim 5, wherein said limiting circuit comprises a shunt circuit to maintain said attenuated mode during transmission of a transmission signal from a transmitter to reduce a transmitted level of said transmission signal.

7. The transceiver of claim 5, wherein said limiting circuit has a hysteresis characteristic which prevents sequential switching of said switch until said level of said switched signal to changes by a predetermined amount.

8. The transceiver of claim 7, wherein said predetermined amount is greater than a change in said level of said switched signal caused by switching of said switch.

9. The transceiver of claim 5, wherein said limiting circuit includes a comparator for comparing said output signal with said predetermined value.

10. The transceiver of claim 9, wherein said limiting circuit further includes a transistor which shunts to ground a control input of said switch when said output signal exceeds said predetermined value.

11. The transceiver of claim 5, wherein said third terminal is connected to a transmitter.

12. The transceiver of claim 5, wherein said output signal is a logarithmic DC value which represents a level of said switched signal.

13. The transceiver of claim 5, wherein said first transistor is turned on and said second transistor is turned off in a receive mode.

14. A transceiver comprising:

a switch having a first terminal for receiving a received signal;

a receiver connected to a second terminal of said switch for receiving a switched signal; and a limiting circuit which switches said switch to an attenuated mode to reduce a level of said switched signal when an output signal of said receiver exceeds a predetermined value;

wherein said limiting circuit comprises a shunt circuit to maintain said attenuated mode during transmission of a transmission signal from a transmitter to reduce a transmitted level of said transmission signal;

wherein said shunt circuit includes a trigger circuit for latching an output of said limiting circuit to turn on a transistor which shunts to ground a control input of said switch when said output signal exceeds said predetermined value in a reception sub-frame.

15. The transceiver of claim 14, wherein said reception sub-frame is immediately prior to a current transmission sub-frame.

16. A wireless handset comprising:

an antenna;

a receiver for receiving a switched signal;

a transmitter transmitting a transmitted signal;

a switch including a first transistor and a second transistor for connecting said antenna, one at a time, to said receiver or to said transmitter, said switch having an attenuated mode for reducing levels of signal passing therethrough; and a limiting circuit which switches said switch to said attenuated mode by turning both said first transistor and said second transistor off when an output signal of said receiver exceeds a predetermined value;

wherein said limiting circuit includes a trigger circuit for latching an output of said limiting circuit to turn on a transistor which shunts to ground a control input of said switch when said output signal exceeds said predetermined value in a reception sub-frame.

17. The wireless handset of claim 16, wherein said limiting circuit includes a shunt circuit to maintain said attenuated mode during a transmission sub-frame.

18. A transceiver comprising:
a switching device having a first switch connected between a first terminal and a second terminal, and a second switch connected between said first terminal and a third terminal;
a receiver connected to said second terminal for receiving a signal provided to said first terminal;
a transmitter connected to said third terminal; and
a controller which switches said switching device to close said first switch and open said second switch in a normal receive mode and to open said first switch and said second switch in an attenuated receive mode to reduce a level of said signal when said level exceeds a predetermined value;
wherein said controller includes a trigger circuit for latching an output of said controller to turn on a transistor which shunts to ground a control input of said switch when said output signal exceeds said predetermined value in a reception sub-frame.

19. The transceiver of claim 18, wherein said controller switches said switching device to open said first switch and close said second switch in a transmission mode.

20. The transceiver of claim 18, wherein said first switch and said second switch are field effect transistors.

21. A wireless handset comprising:
an antenna;
a receiver for receiving a switched signal;
a transmitter transmitting a transmitted signal;
a switch for connecting said antenna, one at a time, to said receiver or to said transmitter, said switch having an attenuated mode for reducing levels of signal passing therethrough; and
a limiting circuit which switches said switch to said attenuated mode when an output signal of said receiver exceeds a predetermined value;
wherein said limiting circuit includes a trigger circuit for latching an output of said limiting circuit to turn on a transistor which shunts to ground a control input of said switch when said output signal exceeds said predetermined value in a reception sub-frame.

22. A transceiver comprising a receiver, a transmitter, a limiting circuit, and a switching device, said switching device having a first switch connected between said receiver and an input/output terminal of said transceiver and a second switch connected between said transmitter and said input/output terminal, wherein in an attenuated receive mode, said first switch and said second switch are opened by said limiting circuit to reduce a level of a signal provided from said input/output terminal to said receiver; wherein said limiting circuit includes a trigger circuit for latching an output of said limiting circuit to turn on a transistor which shunts to ground a control input of said second switch when said output signal exceeds a predetermined value in a reception sub-frame.

23. The transceiver of claim 22, wherein in a receive mode, said first switch is closed to connect said receiver to said input/output terminal and said second switch is opened to disconnect said transmitter from said input/output terminal; and in a transmit mode, said first switch is opened to disconnect said receiver from said input/output terminal and said second switch is closed to connect said transmitter to said input/output terminal.

24. The transceiver of claim 22, wherein said first switch and said second switch are field effect transistors.

* * * * *